C. W. STRICKER.
POWER TRANSMISSION BELT.
APPLICATION FILED FEB. 15, 1916.
1,224,230.
Patented May 1, 1917.
Fig. 1.
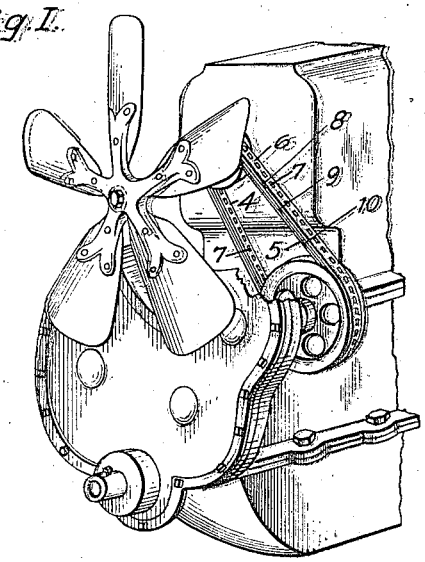
Fig. 2.
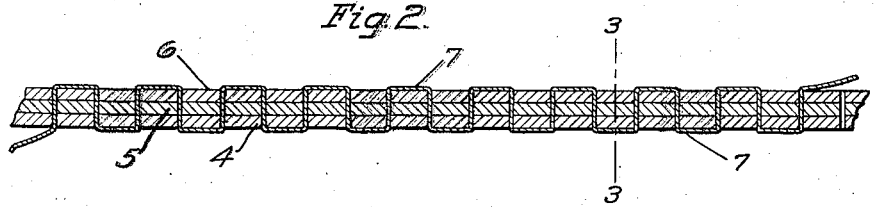
Fig. 4. Fig. 3.
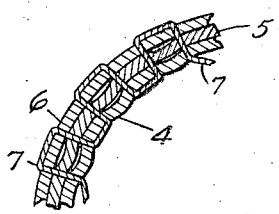 
Witnesses:
J. E. Arthur
H. Thornton Bogert
Inventor
Clarence W. Stricker
By Walter F. Murray
Attorney

UNITED STATES PATENT OFFICE.

CLARENCE W. STRICKER, OF CINCINNATI, OHIO, ASSIGNOR TO THE PERKINS-CAMPBELL COMPANY, OF CINCINNATI, OHIO, A CORPORATION OF OHIO.

POWER-TRANSMISSION BELT.

1,224,230.  Specification of Letters Patent.  Patented May 1, 1917.

Application filed February 15, 1916. Serial No. 78,420.

*To all whom it may concern:*

Be it known that I, CLARENCE W. STRICKER, a citizen of the United States of America, and resident of Cincinnati, in the county of Hamilton and State of Ohio, have invented a new and useful Improvement in Power-Transmission Belts, of which the following is a specification.

This invention relates to improvements in power transmission belts and particularly to the short belts employed in automobile construction for driving fans and generators.

Heretofore, the belts employed for driving the fans and generators of automobiles, have been made most commonly of a series of layers or laminæ of leather which are firmly cemented and securely sewed together. This is highly objectionable in that the cementing and sewing of the leather causes the belt to be unduly stiff and thus renders it incapable of being bent around pulleys of small diameter such as are provided for driving fans and generators in automobile construction.

Further objection is had to these belts in that the stitching soon rots and leaves the independent layers of leather solely dependent upon the cement uniting them. The cement then being subjected to the entire strain of holding the layers together eventually gives way and allows the layers of the belt to fall apart. Where a belt is composed of more than two superimposed laminæ of leather this cementing and stitching renders the belt practically worthless when it is applied to pulleys of small diameter. Such belts as the V-shaped belts employed for transmitting power are preferable to the ordinary flat belt in that the sides of the belt which contact the sides of the pulley, secure a grip thereon and present substantially twice the area of contact as that presented by a flat belt of the same width, but the use of such V-belts has been restricted to pulleys of large diameter if they are to be used at all successfully, since they are usually composed of more than two layers and the cementing and sewing thus renders the belt entirely too stiff to hug the pulley in the manner desired.

It is to overcome these objections that I have devised the belt herein illustrated and described in which an object is to produce a belt of maximum gripping surface and maximum flexibility.

A further object is to produce a belt in which lighter and cheaper leather may be employed without impairing the strength thereof.

A further object is to produce a belt composed of a series of laminæ which operate independently of one another in passing over a pulley and yet which are subjected to substantially uniform tensional strains.

A further object is to produce a belt in which independent stretching of any of the layers of leather is impossible.

These and other objects are attained in the power transmission belt described in the following specification and illustrated in the accompanying drawings, in which;

Figure 1 is a fragmental perspective view of a gas engine having its cooling fan driven by a belt embodying my invention.

Fig. 2 is a fragmental longitudinal sectional view upon an enlarged scale, of a belt embodying my invention.

Fig. 3 is a transverse sectional view taken on the line 3—3 of Fig. 2.

Fig. 4 is a fragmental longitudinal sectional view of a belt embodying my invention, illustrating the independent movement of the several superimposed layers as they are bent around pulleys of small diameter.

The belt embodying my invention is illustrated in the form of a V-belt having a series of laminæ or straps 4, 5 and 6, shaped in such a manner that the upper layer or strap 6 is much wider than the lower layer or strap 4 with the intermediate layer or strap 5 conforming to the substantially V-shaped contour of the belt as shown in Fig. 3. The layers are held together by a leather thong 7 which is threaded in zig zag manner through the layers as shown in Fig. 2. The leather thong 7 is comparatively thick and the distance apart of the central holes in the straps is large, so that when the thong is laced therethrough and pulled tightly to hold the layers in intimate contact with one another there will be enough play between the portions of the straps lying between the stitches to permit of one strap slipping in relation to another, so as to permit the inner straps to adjust themselves to sharper curvatures than the outer one, in passing around a curve. In constructing a belt embodying my invention the layers are first placed together and held by a suitable clamping device while a machine designed for the purpose, shapes the several layers to a substantial V-shape as shown in Fig. 3, by trimming the edges thereof. The trimmed layers are then passed to a machine in which a continuous thong is threaded through the assembled layers and tightened to bring them to the position shown in Fig. 2. In making an endless belt of several layers of leather they are so positioned with relation to one another that their ends are staggered as shown at 8, 9 and 10 in Fig. 1. This is for the purpose of giving the belt substantially the same strength at all sections thereof and to permit it to have the same degree of flexibility at all points of its length. I have found that in the assembling of the several layers it is sometimes more convenient to lightly coat the contacting surfaces thereof with a glue or adhesive designed to temporarily hold the layers together while the thonging operation is being carried out. This adhesive is not intended to cause the layers to be permanently united to any extent, it being of a nature such as to permit the layers to separate upon the belt being bent after the thonging operation is completed. By having the separate layers distinct from one another they will occupy the positions shown in Fig. 4, in which the inner most layers and intermediate layer become bulged and slightly looped with relation to the superimposed layer in passing over a pulley of small diameter. It is this feature which renders the belt so flexible, and the employment of a thong which passes through the several layers and secures them firmly together, and yet which permits of independent movement thereof, which constitutes the principal feature of novelty of my improved belt construction. Not only does the thong create the extreme flexibility of the belt but it also materially adds to its strength and wearing quality in that it is of the same material as the belt itself and is therefore not subject to the deteriorating influences to which the ordinary stitching material in belt construction is subjected. The leather thong will permit of the belt stretching without tearing through the material thereof and without breaking as is the case when ordinary stitching is employed.

Having thus described my invention, what I claim is;

A power transmission belt comprising a series of superimposed straps, each strap having a series of central perforations spaced at comparatively large distances apart, the straps being placed together, so that the perforations in one strap register with the corresponding perforations in another strap, and a leather thong threaded longitudinally through the perforations, so as to make comparatively long stitches and to hold the straps together, but to permit relative movement of one strap to another to afford flexibility in passing over curved surfaces.

In testimony whereof, I have hereunto subscribed my name this 12th day of February, 1916.

CLARENCE W. STRICKER.

Witnesses:
WALTER F. MURRAY,
W. THORNTON BOGERT.